US011888346B2

(12) United States Patent
Wei et al.

(10) Patent No.: US 11,888,346 B2
(45) Date of Patent: Jan. 30, 2024

(54) COMPACT BIONIC EYE DEVICE BASED ON TWO-DEGREE-OF-FREEDOM ELECTROMAGNETICALLY-DRIVEN ROTATING MECHANISM

(71) Applicant: BEIHANG UNIVERSITY, Beijing (CN)

(72) Inventors: Tong Wei, Beijing (CN); Zhongwen Shan, Beijing (CN)

(73) Assignee: BEIHANG UNIVERSITY, Beijing (CN)

(*) Notice: Subject to any disclaimer, the term of this patent is extended or adjusted under 35 U.S.C. 154(b) by 242 days.

(21) Appl. No.: 17/286,777

(22) PCT Filed: Jun. 12, 2020

(86) PCT No.: PCT/CN2020/095750
§ 371 (c)(1),
(2) Date: Apr. 19, 2021

(87) PCT Pub. No.: WO2020/249061
PCT Pub. Date: Dec. 17, 2020

(65) Prior Publication Data
US 2022/0094254 A1    Mar. 24, 2022

(30) Foreign Application Priority Data
Jun. 12, 2019  (CN) .......................... 201910506542.9

(51) Int. Cl.
*H02K 41/06* (2006.01)
*H02K 11/22* (2016.01)
(Continued)

(52) U.S. Cl.
CPC .......... *H02K 41/065* (2013.01); *B25J 19/023* (2013.01); *G01B 11/26* (2013.01);
(Continued)

(58) Field of Classification Search
CPC .. H02K 41/065; H02K 11/22; H02K 2201/18; H02K 1/06; H02K 21/12
(Continued)

(56) References Cited

U.S. PATENT DOCUMENTS

2018/0191577 A1* 9/2018 Cope et al. ............. H04L 41/14

FOREIGN PATENT DOCUMENTS

CN        201008130       1/2008
CN      101527491 A  *   9/2009
(Continued)

OTHER PUBLICATIONS

International Application No. PCT/US2020/095750, International Search Report and Written Opinion dated Dec. 16, 2015.

*Primary Examiner* — Jose A Gonzalez Quinones
(74) *Attorney, Agent, or Firm* — PORUS IP LLC

(57) ABSTRACT

The present disclosure provides a compact bionic eye device based on a two-degree-of-freedom electromagnetically-driven rotating mechanism, which can be used as a vision sensor of bionic robots such as humanoid robots. The compact bionic eye device includes a rotor, stator cores, windings, an angular displacement camera, a spherical hinge pressing block, a stator connector, a camera, a spherical hinge, a camera connector, a rotor connector and an outer spherical shell. According to the compact bionic eye device of the present disclosure, the rotor is driven to achieve limited rotation with pitching and yawing degrees of freedom by regulating a current of the windings of four stators. By adopting a two-degree-of-freedom of electromagnetically-driven rotating mechanism which is compact in structure, the bionic eye device of the present disclosure can achieve a human eye size, and provides important foundation for practical application of bionic eyes in humanoid robots.

6 Claims, 4 Drawing Sheets

(51) Int. Cl.
*H02K 1/06* (2006.01)
*H02K 21/12* (2006.01)
*G06T 7/73* (2017.01)
*B25J 19/02* (2006.01)
*G01B 11/26* (2006.01)
*H04N 23/57* (2023.01)
*H04N 23/695* (2023.01)
*H04N 23/90* (2023.01)

(52) U.S. Cl.
CPC ............... *G06T 7/73* (2017.01); *H02K 11/22* (2016.01); *H04N 23/57* (2023.01); *H04N 23/695* (2023.01); *H02K 2201/18* (2013.01); *H04N 23/90* (2023.01)

(58) Field of Classification Search
USPC .......................................... 310/13, 40 R, 166
See application file for complete search history.

(56) References Cited

FOREIGN PATENT DOCUMENTS

| CN | 203056800 | | | 7/2013 | |
| CN | 105703528 | A | * | 6/2016 | ............. B62D 15/00 |
| CN | 106341023 | A | * | 1/2017 | ............... H02K 1/12 |
| CN | 106451994 | | | 2/2017 | |
| CN | 109818472 | | | 5/2019 | |
| CN | 110434897 | | | 11/2019 | |
| JP | 2003324936 | | | 11/2003 | |
| JP | 2014093876 | | | 5/2014 | |

* cited by examiner

COMPACT BIONIC EYE DEVICE BASED ON TWO-DEGREE-OF-FREEDOM ELECTROMAGNETICALLY-DRIVEN ROTATING MECHANISM

CROSS-REFERENCE TO RELATED APPLICATIONS

This application is a national stage application pursuant to 35 U.S.C. § 371 of International Application No. PCT/CN2020/095750, filed Jun. 12, 2020, the disclosure of which is hereby incorporated by reference herein.

TECHNICAL FIELD

The present disclosure relates to a compact bionic eye device based on a two-degree-of-freedom electromagnetically-driven rotating mechanism, which can be used as a vision sensor of bionic robots such as humanoid robots.

BACKGROUND

The widespread application of robots plays an important role in an industrial society and is also a development trend of an industrial society. As an important category of robots, humanoid robots imitate the results of human evolution, and have better flexibility and adaptability in cooperating with people or replacing people to do related work. Our eyes are the most important organ for us to obtain information. Therefore, from the perspective of imitating humans, vision sensors will become the most important device for humanoid robots to obtain external information. A bionic eye is a vision sensor that can realize a two-degree-of-freedom or three-degree-of-freedom rotational motion. After additionally provided with corresponding control hardware and processing software, the bionic eye can imitate human vision to achieve functions such as target recognition and target tracking (including conjugate motion, non-conjugate motion, and reflective motion). Therefore, these functions become an important development direction of vision sensors for humanoid robots.

The diversified motors are considered as the most technologically mature way for driving, and therefore a present bionic eye achieves a three-degree-of-freedom or a two-degree-of-freedom motion by mainly adopting three motors connected in parallel or two motors connected in series. However, a motor requires a proper output torque to ensure a motion acceleration of a bionic eye. In addition, the overall bionic eye has a much larger size than a human eye due to its high quantity of internal members, complicated structure and large lower limit of the size. As a result, the practical application of bionic eyes in humanoid robots is limited. At present, the size of a bionic eye can be reduced by either of the following three methods: (a) An artificial muscle-type actuator is used to replace a motor. It is a more complete way for a bionic eye. However, the research of artificial muscles is still in an initial stage with high-degree nonlinear force output and quite poor resolution and accuracy. Therefore, linear motors and flexible cables are used to imitate artificial muscles in some bionic eyes. However, in terms of same force output, a linear motor is larger than a rotating motor and accordingly cannot actually reduce the size of a bionic eye. (b) A steering engine with a small size is used to replace a motor. However, a steering engine is mainly composed of a motor and a deceleration mechanism. Generally, the size of a steering engine is reduced by simplifying members or replacing some members with low-precision members, which causes significant reduction of the driving accuracy, and as a result, the steering engine cannot meet the requirements on motion accuracy of a bionic eye. (c) A two-degree-of-freedom motor is used to replace two single-degree-of-freedom motors. In this way, the overall size of the motor is reduced by an integrated design. However, a conventional motor structure is still used, which does not achieve an obvious effect in reducing the size of a bionic eye and even affects the motion performance of a bionic eye due to factors such as magnetic coupling, mechanical friction, and unbalanced torque.

SUMMARY

The technical problem to be solved by the present disclosure is to provide a bionic eye device which achieves a human eye size based on an integrated design by replacing two single-degree-of-freedom motors with a two-degree-of-freedom electromagnetically-driven rotating mechanism with less members and a simpler structure, so as to overcome the problem that a bionic eye is too large in size due to a large size of an actuator.

The present disclosure adopts a technical solution as follows: a compact bionic eye device based on a two-degree-of-freedom electromagnetically-driven rotating mechanism consists of a stator assembly and a rotor assembly. The stator assembly includes an outer spherical shell, stator cores, a stator connector, an angular displacement camera, a spherical hinge pressing block and windings. The rotor assembly includes a camera, a rotor, a rotor connector, a spherical hinge and a camera connector. The four stator cores are fixedly connected with the outer spherical shell and uniformly distributed along the large circumference of the outer spherical shell. The stator connector is located at the central position of the four stator cores and used for connecting and fixing the four stator cores. The rotor connector, the spherical hinge and the camera connector form a transmission rod. The center of the spherical hinge is in the center of a central spherical surface of the rotor, and restrains the rotor assembly to rotate around a fixed-point, i.e., around the center of the central spherical surface of the rotor. The spherical hinge pressing block and the stator connector are arranged at both sides of spherical hinge, close to the camera and the rotor respectively. In this way, a sphere pair is formed by the spherical hinge, the spherical hinge pressing block and the stator connector.

The rotor is of a quartered structure like a hemispherical shell. The section formed by each quadrant segment being cut by any plane with fixed axis is a sector ring. The fixed axis, in symmetry plane of a quadrant segment and its opposite one, is the only straight line parallel to the end-face circle of the rotor. The width of the sector ring of the section is 2d and $d=d_{max}-\eta_d\theta/\theta_{max}$, where $\theta$ represents an included angle of a cutting surface and a symmetry surface, $d_{max}$ represents half the width of the sector ring of the section when $\theta$ is equal to 0, $\theta_{max}$ represents the maximum value of $\theta$, and $\eta_d$ is a constant representing that the width of the sector ring of the section decreases with an increase of $\theta$.

The stator cores, the rotor and the windings form four double-gap electromagnets, where each stator core corresponds to one quadrant segment of the rotor. Moreover, the surface of each stator pole is parallel to the surface of the rotor. The stator cores and the rotor are both made from a magnetic material.

Every two opposite electromagnets are used to drive the rotor assembly to do a one-degree-of-freedom motion. By regulating the current of the four windings, the rotor assembly can be driven to do a two-degree-of-freedom motion including positive/negative pitching and positive/negative yawing, respectively.

The angular displacement camera is used for taking a feature image of the bottom of the rotor, and the image can be processed to calculate an actual rotating angle, namely a yawing angle and a pitching angle of the rotor.

The compact bionic eye device can be combined with a close-loop controller to control angle of the rotor assembly. Based on difference between the actual angle and specified one, a regulation value of the current of each winding is calculated, so that the current of the windings is regulated to drive the rotor assembly, and the actual angle tends to the specified one.

The principle of the compact bionic eye device of the present disclosure is: the angular displacement camera takes a feature image of the bottom of the outer surface of the rotor in real time, the image is processed to obtain image coordinates of a feature point, and thus actual yawing angle and pitching angle of the rotor can be calculated. The winding of each electromagnet is electrified to make sure that two poles in each double-gap electromagnet produce electromagnetic attraction forces to the rotor. The two attraction forces are both perpendicular to the surface of the rotor, and there is also a quite small included angle between the inner and outer surfaces of the rotor, so a resultant force is toward the tangential direction of the rotor, namely in the positive/negative pitching and positive/negative yawing directions of the rotor. Based on a difference between an actual rotating angle and a specified rotating angle of the rotor, a regulation value of the current of each winding is calculated, and thus the current of the windings is regulated, namely the rotor assembly can be driven to have a pitching angle and a yawing angle clearly equal to the specified rotating angle.

Compared with a present bionic eye device, the compact bionic eye device of the present disclosure has the advantages that: taking advantage of the characteristic that a bionic eye rotates in a limited range, a two-degree-of-freedom limited rotation mechanism which is electromagnetically driven is used as an actuator: therefore, the bionic eye device of the present disclosure has few members, simpler structure and smaller size: by virtue of an integrated design, the size of the bionic eye can be greatly reduced to achieve compact prototype with human eye size.

DETAILED DESCRIPTION

Figure 1:
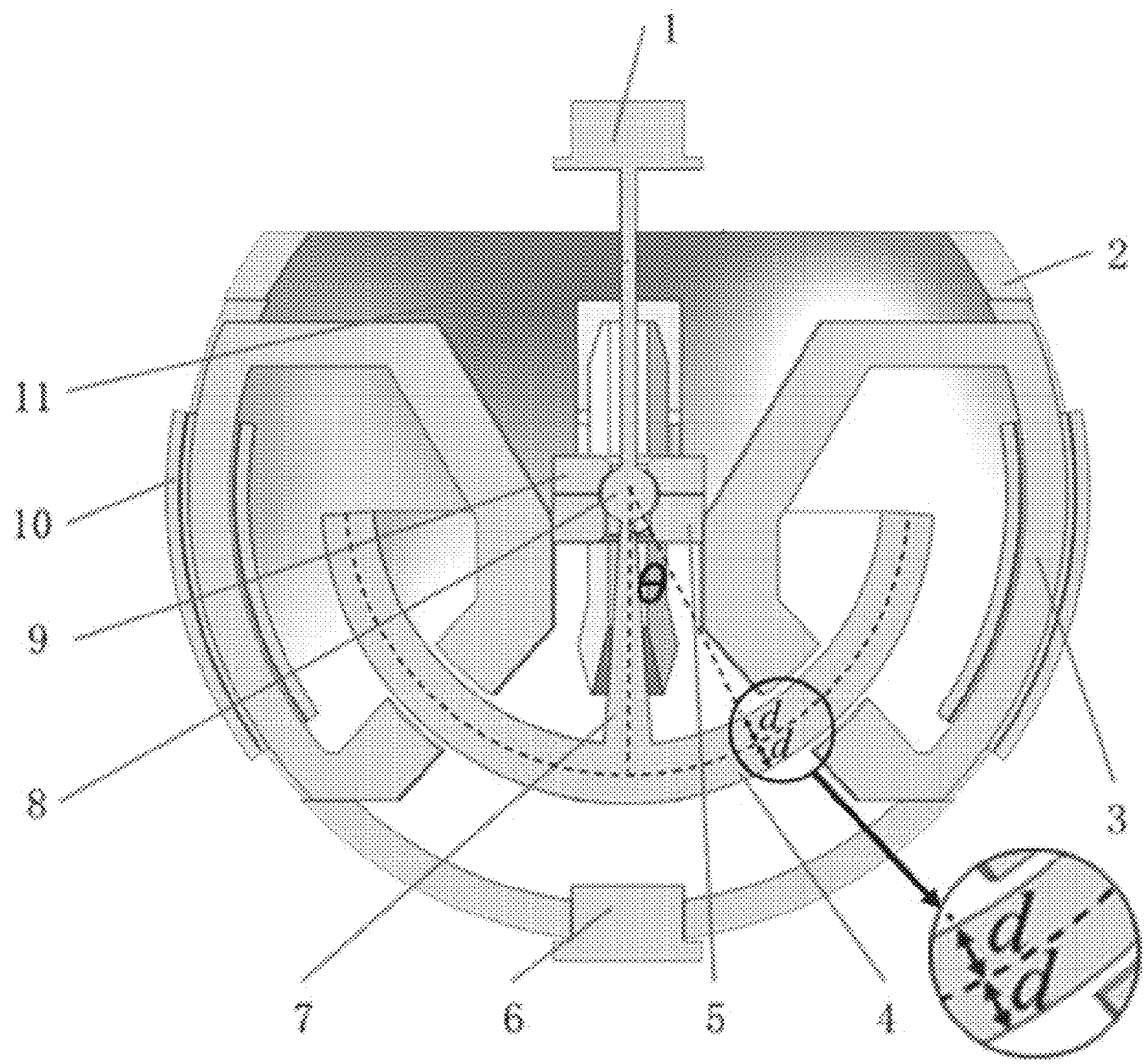
FIG. 1 is a structural diagram of a compact bionic eye device based on a two-degree-of-freedom electromagnetically-driven rotating mechanism of the present disclosure.

FIG. 1 shows the structural diagram of the compact bionic eye device, where the overall compact bionic eye device consists of a stator assembly and a rotor assembly. The stator assembly includes an outer spherical shell 2, stator cores 3, a stator connector 5, an angular displacement camera 6, a spherical hinge pressing block 9 and windings 10. The rotor assembly includes a camera 1, a rotor 4, a rotor connector 7, a spherical hinge 8 and a camera connector 11. The four stator cores 3 are fixedly connected with the outer spherical shell 2 and uniformly distributed along the large circumference of the outer spherical shell 2. The stator connector 5 is located at the central position of the four stator cores 3 and used for connecting and fixing the four stator cores 3. The rotor connector 7, the spherical hinge 8 and the camera connector 11 form a transmission rod. The center of the spherical hinge 8 is concentric with the center of a central spherical surface of the rotor 4, and restrains the rotor assembly to rotate around a fixed-point, i.e., around the center of the central spherical surface of the rotor 4. The spherical hinge pressing block 9 and the stator connector 5 are arranged at both sides of spherical hinge 8, close to the camera and the rotor respectively. In this way, a sphere pair is formed by the spherical hinge 8, the spherical hinge pressing block 9 and the stator connector 5.

The rotor 4 shown in FIG. 1 is of a quartered structure like a hemispherical shell. The section formed by each quadrant segment being cut by any plane with fixed axis is a sector ring. The fixed axis, in symmetry plane of a quadrant segment and its opposite one, is the only straight line parallel to the end-face circle of the rotor 4. The width of the sector ring of the section is 2d. According to the requirements of a human eye size, the diameter of the outer spherical shell 2 is 24 mm: the radius of the central spherical surface of the rotor 4 is 7.5 mm; if $\theta$ represents an included angle of a cutting surface and a symmetry surface, when $\theta$ is equal to 0, $d_{max}$=0.8 mm, namely half the width of the sector ring of the section; the maximum value $\theta_{max}$ of $\theta$ is equal to 86 degrees; a constant representing that the width of the sector ring of the section decreases with an increase of $\theta$ is $\eta_d$ which is equal to 0.215; and accordingly d=0.8−0.215$\theta$/86 (mm).

Figure 2:
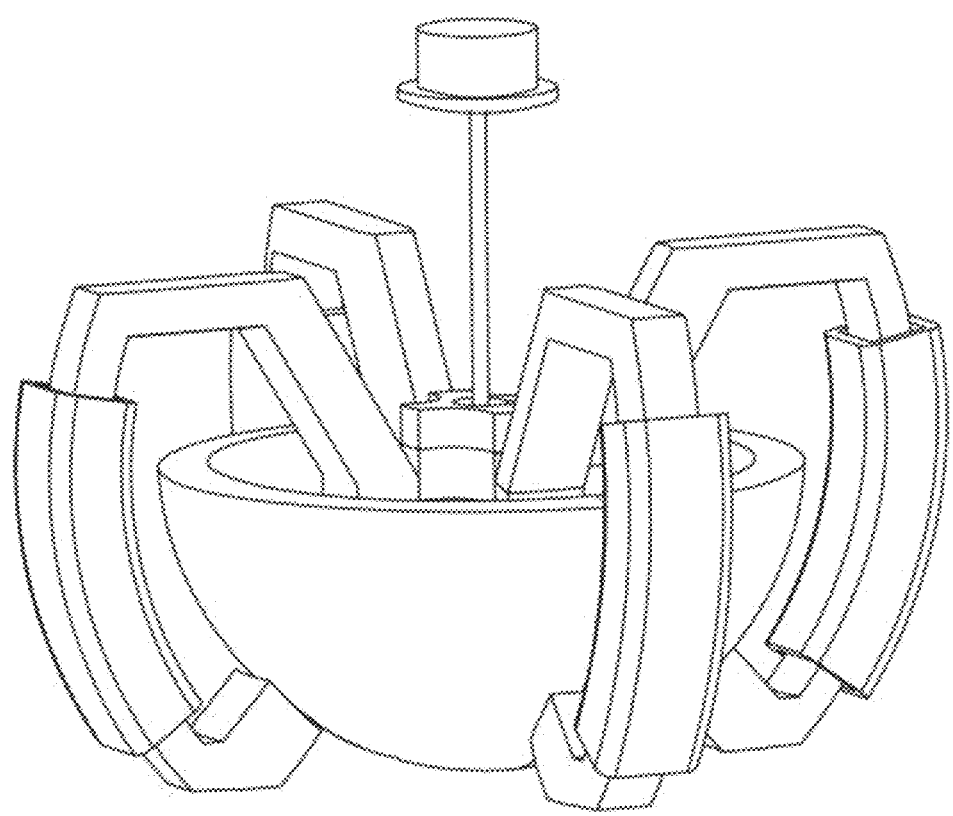
FIG. 2 is a three-dimensional diagram of the interior of the compact bionic eye device based on a two-degree-of-freedom electromagnetically-driven rotating mechanism of the present disclosure.

FIG. 2 shows the three-dimensional diagram of the interior of the compact bionic eye device, where the stator cores 3, the rotor 4 and the windings 10 form four double-gap electromagnets, where each stator core 3 corresponds to one quadrant segment of the rotor 4. Moreover, the surface of each stator pole is parallel to the surface of the rotor 4. The stator cores 3 and the rotor 4 are both made from a magnetic material. Every two opposite electromagnets are used to drive the rotor assembly to do a one-degree-of-freedom motion. By regulating the current of the four windings 10, the rotor assembly can be driven to do a two-degree-of-freedom motion including positive/negative pitching and positive/negative yawing, respectively.

Figure 3:
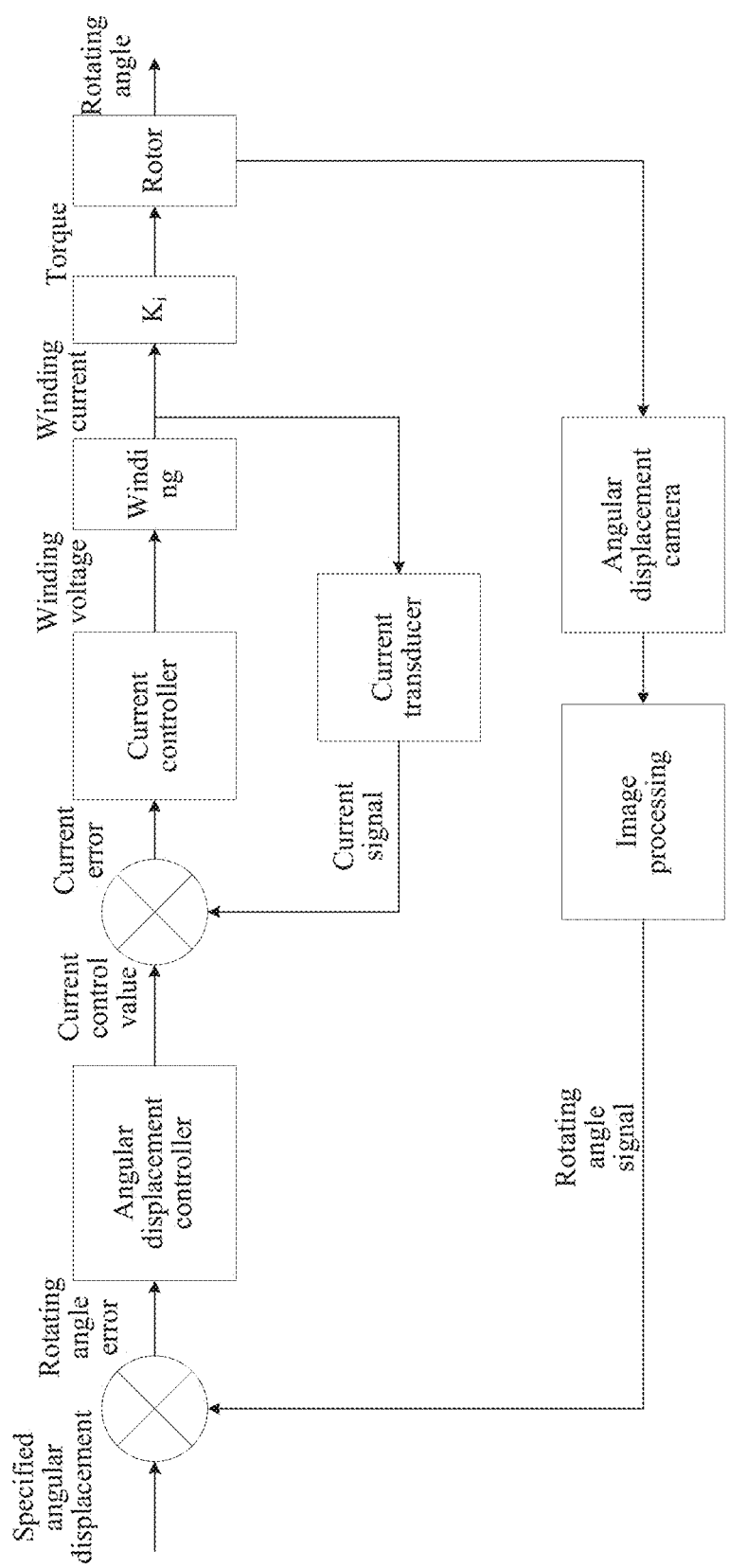
FIG. 3 is a flow diagram of a control system of the compact bionic eye device based on a two-degree-of-freedom electromagnetically-driven rotating mechanism of the present disclosure.

FIG. 3 shows the flow diagram of the control system of the bionic eye device, where the compact bionic eye device can be combined with a close-loop controller to control angle of the rotor assembly. Based on difference between the actual angle and specified one, a regulation value of the current of each winding 10 is calculated, so that the current of the windings 10 is regulated to drive the rotor assembly, and the actual angle tends to the specified one. The angular displacement camera 6 is used for taking a feature image of the bottom of the rotor, and the image can be processed to calculate an actual rotating angle, namely a yawing angle and a pitching angle of the rotor.

Figure 4:
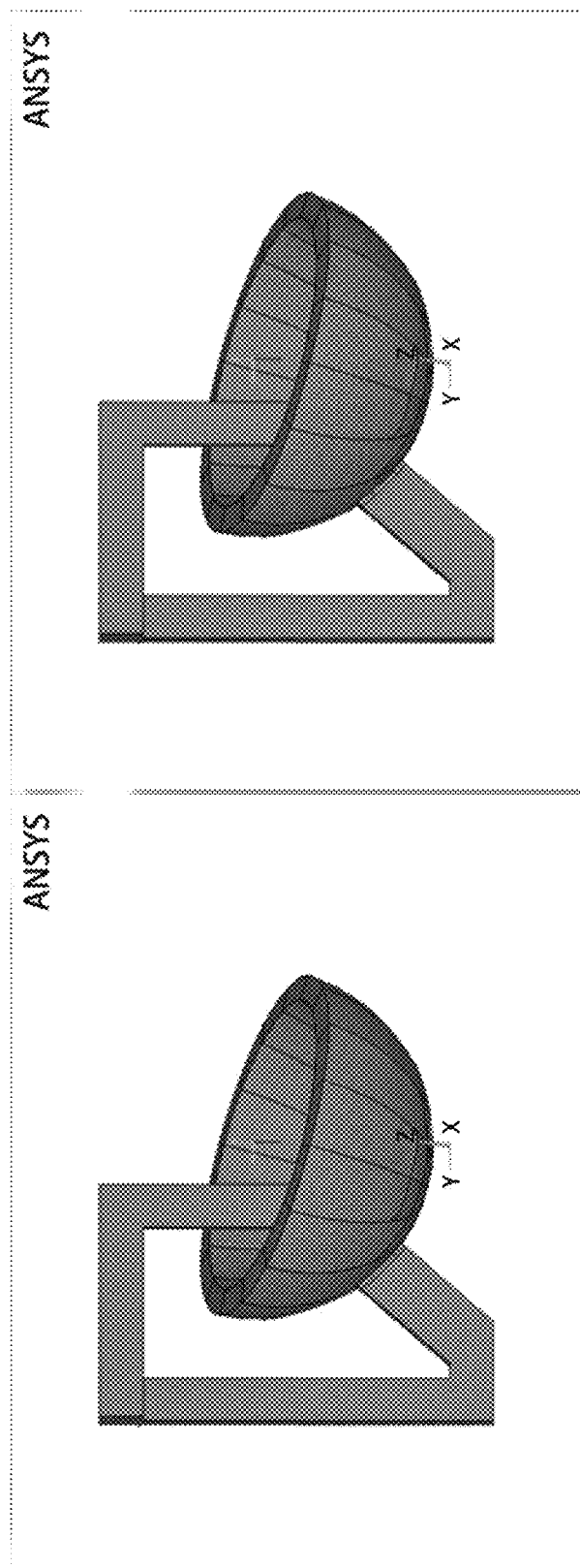
FIG. 4 shows results of finite element analysis of an electromagnetic field of a magnetic circuit of one electromagnet of the compact bionic eye device based on a two-degree-of-freedom electromagnetically-driven rotating mechanism of the present disclosure.

When the rotor 4 of the bionic eye rotates 30 degrees about axis x, electromagnetic field finite element analysis is performed with respect to magnetic circuit of a +y electromagnet causing the rotation, and the results are shown in FIG. 4, where electromagnetic forces in axis x, axis y and axis z are $0.66231\times10^{-3}$ N, $0.21417\times10^{-2}$ N, $0.20977\times10^{-2}$ N respectively: the driving torque around axis x is $0.22484\times10^{-4}$ Nm; and an angular acceleration that can be provided is as high as 153.91 rad/s$^{-2}$.

The content not described in detail in the description is existing technologies known by those skilled in the art.

What is claimed is:

1. A compact bionic eye device based on a two-degree-of-freedom electromagnetically-driven rotating mechanism, being composed of a stator assembly and a rotor assembly, wherein the stator assembly comprises an outer spherical shell (2), stator cores (3), a stator connector (5), an angular displacement camera (6), a spherical hinge pressing block (9) and windings (10); and the rotor assembly comprises a camera (1), a rotor (4), a rotor connector (7), a spherical hinge (8) and a camera connector (11); four stator cores (3) are fixedly connected with the outer spherical shell (2) and uniformly distributed along the large circumference of the outer spherical shell (2); the stator connector (5) is located at the central position of the four stator cores (3) and used for connecting and fixing the four stator cores (3); the rotor connector (7), the spherical hinge (8) and the camera connector (11) form a transmission rod; the center of the spherical hinge (8) is concentric with the center of a central spherical surface of the rotor (4) and restrains the rotor assembly to rotate around a fixed-point, i.e., around the center of the central spherical surface of the rotor (4); the spherical hinge pressing block (9) and the stator connector (5) are arranged at both sides of spherical hinge (8), close to the camera and the rotor respectively; and in this way, a sphere pair is formed by the spherical hinge (8), the spherical hinge pressing block (9) and the stator connector (5).

2. The compact bionic eye device based on a two-degree-of-freedom electromagnetically-driven rotating mechanism according to claim 1, wherein the rotor (4) is of a quartered structure like a hemispherical shell; the section formed by each quadrant segment being cut by any plane with fixed axis is a sector ring; the fixed axis, in symmetry plane of a quadrant segment and its opposite one, is the only straight line parallel to the end-face circle of the rotor; a width of the sector ring of the section is 2d and $d=d_{max}-\eta_d\theta/\theta_{max}$, wherein $\theta$ represents an included angle of a cutting surface and a symmetry surface, $d_{max}$ represents half the width of the sector ring of the section when $\theta$ is equal to 0, $\theta_{max}$ represents a maximum value of $\theta$, and $\eta_d$ is a constant that represents that the width of the sector ring of the section decreases with an increase of $\theta$.

3. The compact bionic eye device based on a two-degree-of-freedom electromagnetically-driven rotating mechanism according to claim 1, wherein the stator cores (3), the rotor (4) and the windings (10) form four double-gap electromagnets, each stator core (3) corresponds to one quadrant segment of the rotor (4), the surface of each stator pole is parallel to the surface of the rotor; and the stator cores (3) and the rotor (4) are both made from a magnetic material.

4. The compact bionic eye device based on a two-degree-of-freedom electromagnetically-driven rotating mechanism according to claim 1, wherein every two opposite electromagnets are used to drive the rotor assembly to do a one-degree-of-freedom motion; and by regulating a current of the four windings (10), the rotor assembly can be driven to do a two-degree-of-freedom motion including positive/negative pitching and positive/negative yawing, respectively.

5. The compact bionic eye device based on a two-degree-of-freedom electromagnetically-driven rotating mechanism according to claim 1, wherein the angular displacement camera (6) is used for acquiring a feature image of the bottom of the rotor; and the acquired image can be processed to calculate an actual rotating angle, namely a yawing angle and a pitching angle of the rotor assembly.

6. The compact bionic eye device based on a two-degree-of-freedom electromagnetically-driven rotating mechanism according to claim 1, wherein the compact bionic eye device can be combined with a close-loop controller to control angle of the rotor assembly; based on difference between an actual angle and a specified one, a regulation value of the current of each winding (10) is calculated, so that the current of the windings (10) is regulated to drive the rotor assembly, and the actual angle tends to the specified one.

* * * * *